United States Patent
Naor et al.

(10) Patent No.: US 9,231,908 B2
(45) Date of Patent: Jan. 5, 2016

(54) ENSURING SYMMETRIC ROUTING TO PRIVATE NETWORK

(75) Inventors: Yaniv Naor, Ramat-HaSharon (IL); Dmitry A. Anipko, Seattle, WA (US); Sharad Kylasam, Seattle, WA (US); Scott A. Roberts, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 665 days.

(21) Appl. No.: 13/368,347

(22) Filed: Feb. 8, 2012

(65) Prior Publication Data

US 2013/0205040 A1  Aug. 8, 2013

(51) Int. Cl.
*G06F 15/173* (2006.01)
*H04L 29/12* (2006.01)

(52) U.S. Cl.
CPC .......... *H04L 61/2592* (2013.01); *H04L 61/256* (2013.01)

(58) Field of Classification Search
USPC ....................................................... 709/238
See application file for complete search history.

(56) References Cited

U.S. PATENT DOCUMENTS

| | | | | |
|---|---|---|---|---|
| 7,657,642 | B2 * | 2/2010 | Blanchet | 709/230 |
| 7,716,323 | B2 * | 5/2010 | Gole et al. | 709/224 |
| 2005/0005023 | A1 * | 1/2005 | Dobbins et al. | 709/238 |
| 2005/0169288 | A1 * | 8/2005 | Kamiwada et al. | 370/401 |
| 2006/0251088 | A1 * | 11/2006 | Thubert et al. | 370/401 |
| 2009/0113521 | A1 * | 4/2009 | Engdahl et al. | 726/3 |
| 2011/0103393 | A1 * | 5/2011 | Meier et al. | 370/401 |
| 2012/0079113 | A1 * | 3/2012 | Zhu et al. | 709/225 |
| 2013/0103785 | A1 * | 4/2013 | Lyon | 709/217 |
| 2013/0166965 | A1 * | 6/2013 | Brochu et al. | 714/48 |

* cited by examiner

*Primary Examiner* — Vivek Srivastava
*Assistant Examiner* — Normin Abedin
(74) *Attorney, Agent, or Firm* — Aneesh Mehta; Kate Drakos; Micky Minhas (57) ABSTRACT

Aspects of the subject matter described herein relate to symmetric routing to a private network. In aspects, a remote client may try to connect to an entity of a private network using a non-routable network address. Upon detecting that connectivity is not established or not possible via a given network address, the client may obtain network data associated with a gateway that provides access to the private network and create a virtual interface where the gateway is the next-hop router. After creating the virtual interface, the client may communicate with entities of the private network using the virtual interface of the client. By sending traffic through the virtual interface with a source address having a prefix associated with the gateway, the client may ensure that traffic sent to and from the private network traverses the gateway.

20 Claims, 7 Drawing Sheets

ENSURING SYMMETRIC ROUTING TO PRIVATE NETWORK

BACKGROUND

Some protocols rely on having network traffic between two entities pass through the same intermediate device. If network traffic between the two entities does not pass through the intermediate device, the protocols may not work properly. In addition, the intermediate device may be located on a private network behind a network address translation (NAT) device. Furthermore, a firewall network device may block certain messages of the intermediate device from reaching the public Internet.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to symmetric routing to a private network. In aspects, a remote client may try to connect to an entity of a private network using a non-routable network address. Upon detecting that connectivity is not established or not possible via a given network address, the client may obtain network data associated with a gateway that provides access to the private network and create a virtual interface where the gateway is the next-hop router. After creating the virtual interface, the client may communicate with entities of the private network using the virtual interface of the client. By sending traffic through the virtual interface with a source address having a prefix associated with the gateway, the client may ensure that traffic sent to and from the private network traverses the gateway.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions. Likewise, without additional language, the terms "first network address" and a "second network address" may be used in the claims for identification purposes rather than employing any ordering on the network addresses.

Headings are for convenience only; information on a given topic may be found outside the section whose heading indicates that topic.

Other definitions, explicit and implicit, may be included below.

Exemplary Operating Environment

Figure 1:
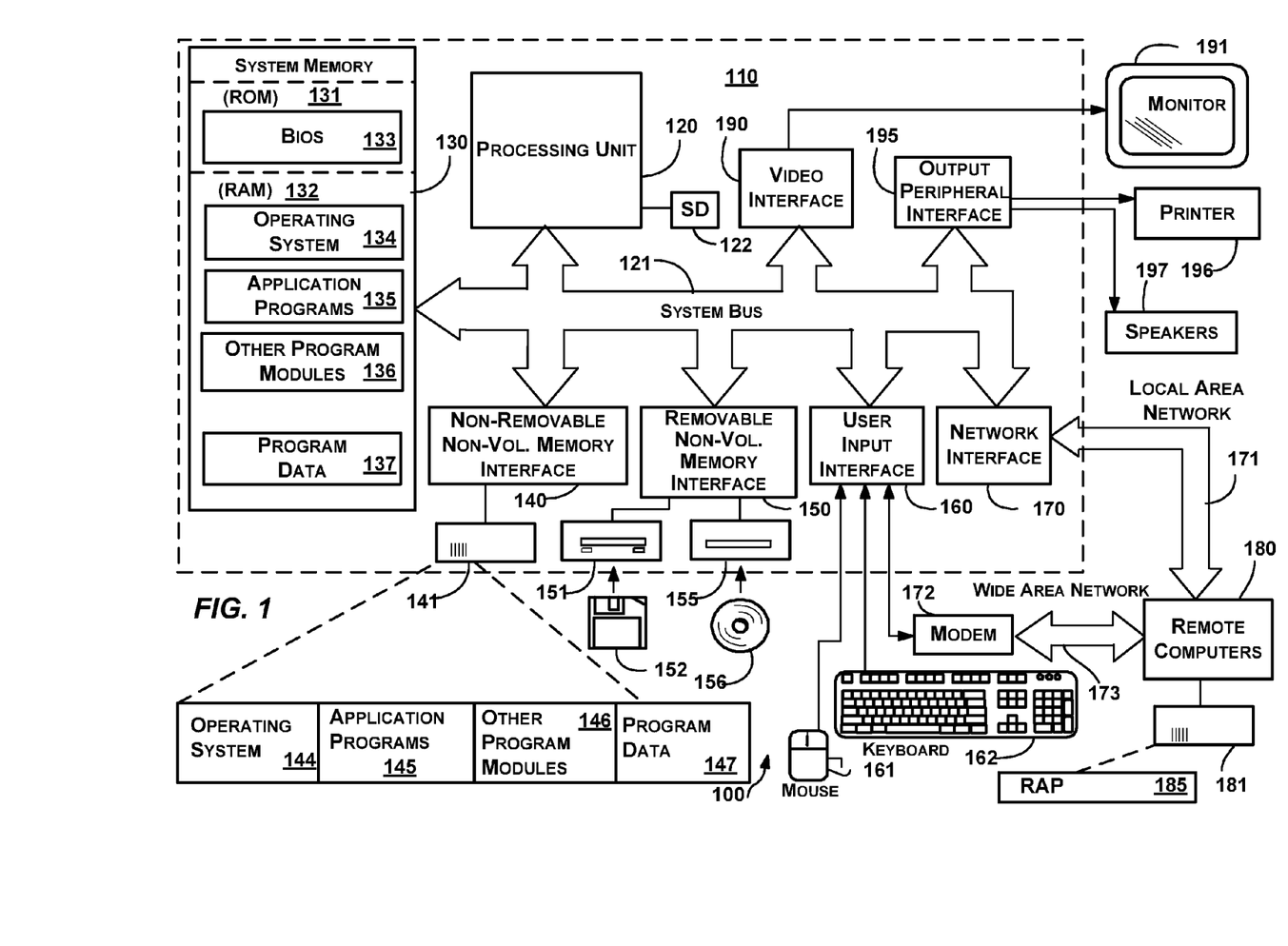
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device 122. The security device 122 may store and be able to generate cryptographic keys that may be used to secure various aspects of the computer 110. In one embodiment, the security device 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable nonvolatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Symmetric Routing

As mentioned previously, some protocols and other mechanisms rely on having network traffic between two entities pass through the same intermediate device.

Figure 2:
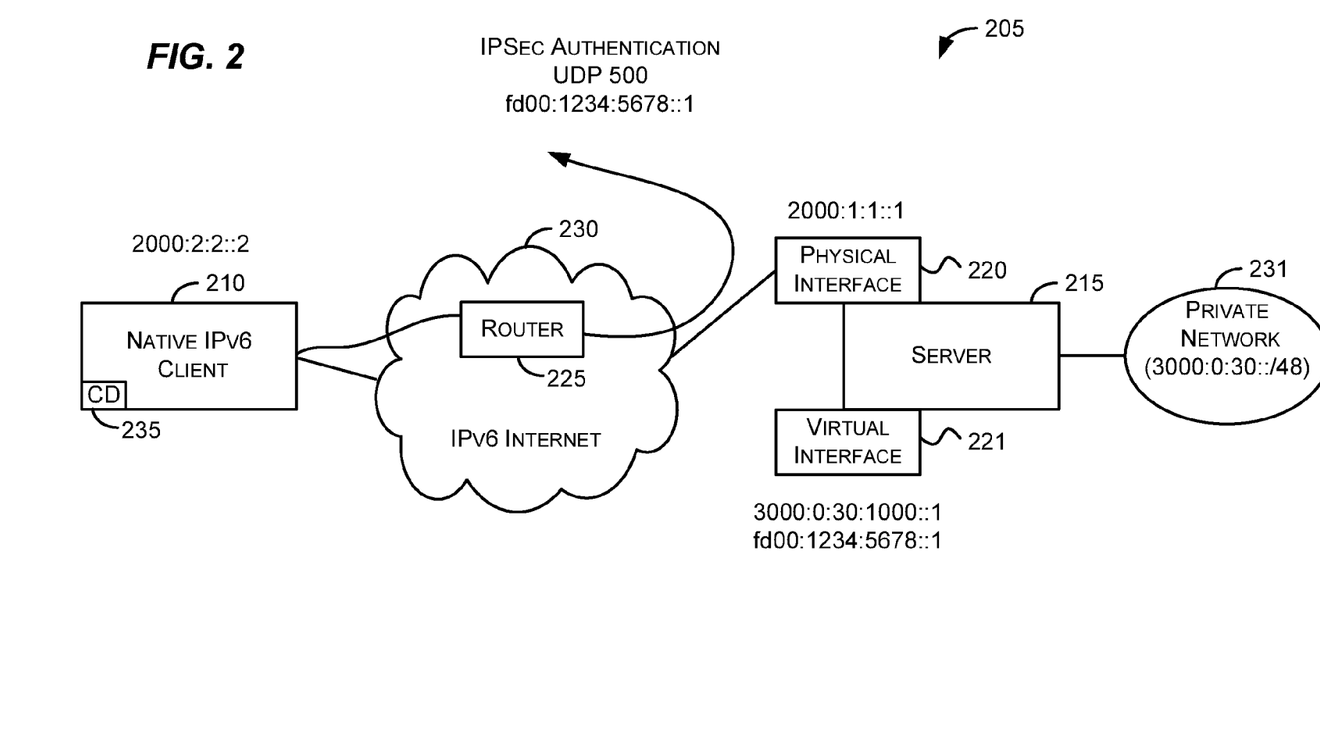
FIGS. 2-4 are block diagrams that represent exemplary environments in which aspects of the subject matter described herein may be implemented.
Figure 3:
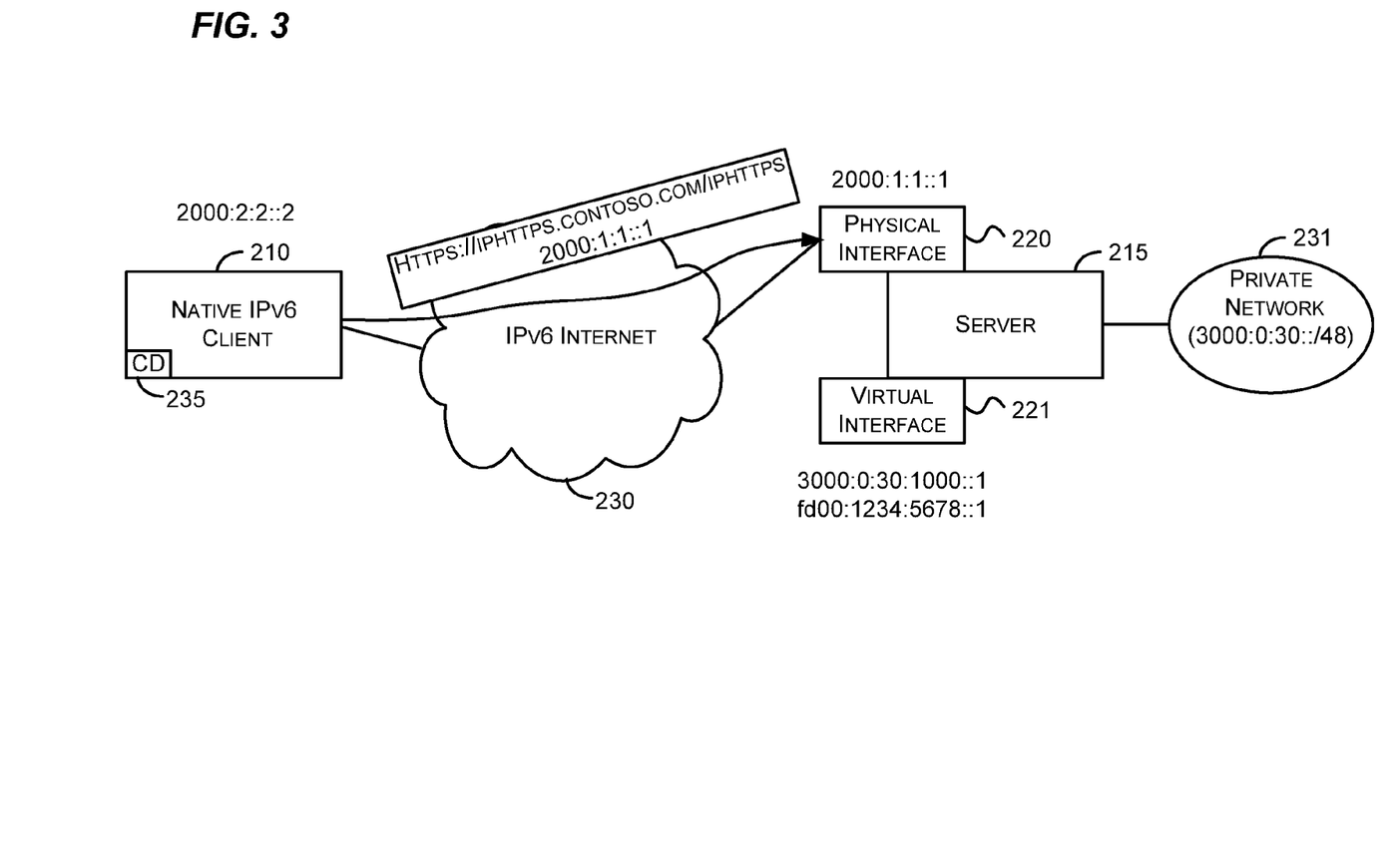
Figure 4:
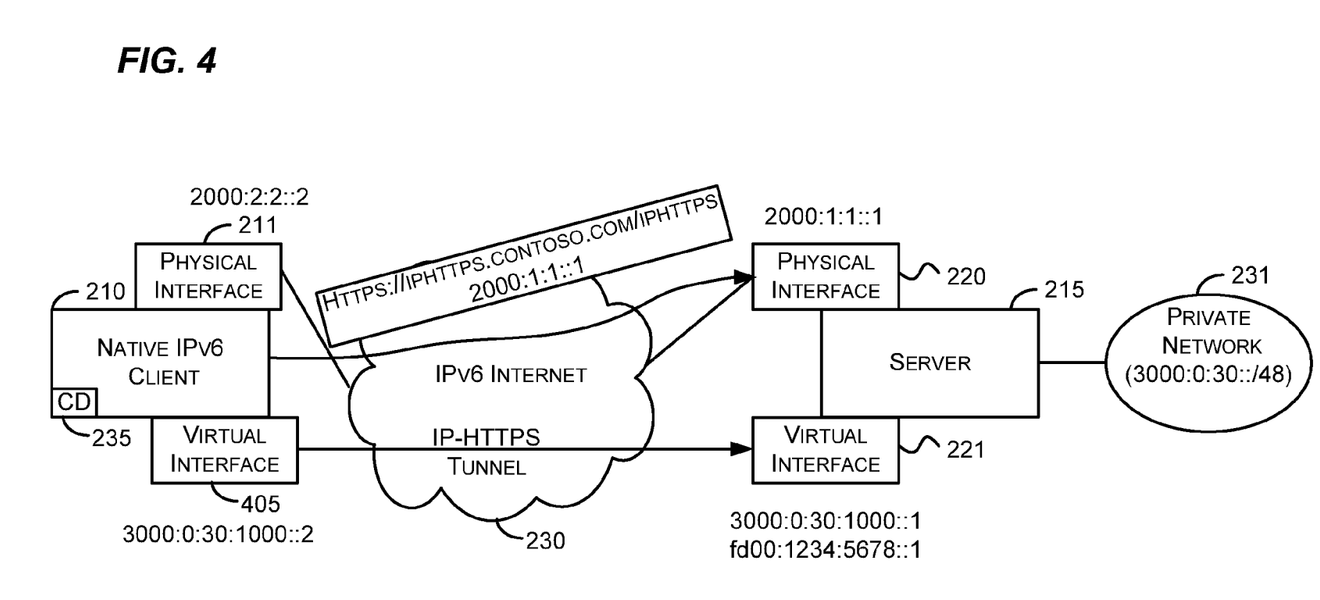

FIGS. 2-4 are block diagrams that represent exemplary environments in which aspects of the subject matter described herein may be implemented. The components illustrated in FIGS. 2-4 are exemplary and are not meant to be all-inclusive of components that may be needed or included. In other embodiments, the components and/or functions described in conjunction with FIGS. 2-4 may be included in other components (shown or not shown) or placed in subcomponents without departing from the spirit or scope of aspects of the subject matter described herein. In some embodiments, the components and/or functions described in conjunction with FIGS. 2-4 may be distributed across multiple devices.

The environments illustrated in FIGS. 2-4 have Internet Protocol (IP) addresses next to some of the components of the environments. These IP addresses are used for illustration and are exemplary only. In various implementations, the IP addresses associated with each component may be different than those illustrated. Furthermore, even in a single implementation, the IP addresses may change from time to time or in response to certain events.

Furthermore, although the environments illustrate components that operate in accordance with the IP version 6 (IPv6) protocol, there is no intention to limit aspects of the subject matter described herein to only components that operate in an IPv6 environment. In some implementations, for example, the components may operate in an IPv4 environment, an environment that includes IPv4 and IPv6 components, or the like.

In addition, although the terms "client" and "server" are sometimes used herein, it is to be understood, that a client may be implemented on a machine that has hardware and/or software that is typically associated with a server and that likewise, a server may be implemented on a machine that has hardware and/or software that is typically associated with a desktop, personal, or mobile computer. Furthermore, a client may at times act as a server and vice versa. In an embodiment, a client and a server may both be peers, servers, or clients. In one embodiment, a client and a server may be implemented on the same physical machine.

As used herein, each of the terms "server" and "client" may refer to one or more physical or virtual entities, one or more processes executing on one or more physical or virtual entities, and the like. Thus, a server may include an actual physical node upon which one or more processes execute, a virtual node upon which one or more processes executed, a service executing on one or more nodes, or a group of nodes that together provide a service. A service may include one or more processes executing on one or more physical or virtual entities. Furthermore, a single process may implement one or more servers.

Turning to FIG. 2, the environment 205 may include a client 210, a server 215, zero or more network devices (e.g., a router 225, other routers (not shown) and other network devices (not shown)), networks 230 and 231, and other components (not shown). The client 210, the router 225, and the server 215 may be located relatively close to each other or may be located at various places around the world.

In an embodiment, the network 230 may comprise or be part of the Internet. In an embodiment, the network 230 may comprise one or more local area networks, wide area networks, direct connections, virtual connections, private networks, virtual private networks, some combination of the above, and the like. In one embodiment, the network 230 may be used for both IPv4 and IPv6 traffic. As known to those skilled in the art, IPv4 is a protocol identified by Request for Comments (RFC) 791 while IPv6 is a protocol identified by RFC 2460.

In an embodiment, the private network 231 may be separated from the network 230 by one or more network devices such as routers, firewall, gateways, other network devices, and the like. An entity may control and direct traffic to and from the private network 231 using one or more of the network devices mentioned above.

The client 210, the server 215, and the router 225 may comprise or reside on one or more general or special purpose computing devices. Such devices may include, for example, personal computers, server computers, hand-held or laptop devices, multiprocessor systems, microcontroller-based systems, set top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as the client 210, the server 215, or the router 225 comprises the computer 110 of FIG. 1.

In one embodiment, the client 210 may be configured to communicate using the IPv6 protocol only. Using the IPv6 protocol, the client may communicate with other IPv6 entities connected to the network 230 using mechanisms that are well understood by those skilled in the art. In another embodiment, the client 210 may be configured to communicate using the IPv4 protocol, both the IPv4 protocol and the IPv6 protocol, or some other protocol.

The client 210 may be configured with an IP address (e.g., fd00:1234:5678::1) of a tunnel endpoint with which to reach the private network 231. In one implementation, this tunnel endpoint is a Unique Local Address (ULA) as defined in RFC 4193. A ULA is meant for use within a private network and is not routable over the global IPv6 network 230. Although ULA is sometimes used herein, other non-routable addresses may also be used without departing from the spirit or scope of aspects of the subject matter described herein.

When the client 210 attempts to create a connection with the private network 231, it may first attempt to do an authentication using the ULA address (e.g., fd00:1234:5678::1) of the remote tunnel endpoint. If connecting to a WINDOWS® server, the client 210 may attempt authenticating using Internet Protocol Security (IPsec) and the AuthIP protocol UDP 500. In other environments, the client 210 may attempt authenticating to an entity at the ULA address using some other authentication protocol.

Because the ULA address may not be routable over the global IPv6 network 230, network devices within the network 230 (e.g., the router 225) may not be able to find the entity at the address and the authentication negotiation may fail.

The connectivity detector 235 of the client 210 may detect that there is no connection to the private network 231 and may inform the client 210 of the lack of connectivity to the private network 231. A connection may but is not required to be associated with state. A connection may comprise an association between two or more entities. In response to detecting that there is no connection to the private network 231, the client 210 may take additional actions to attempt to establish a connection with the private network 231.

For example, the client 210 may attempt to establish a tunnel with a gateway hosted by the server 215 by using a public address (e.g., IPv4, IPv6, or other public address) of the server 215. An exemplary IPv6 public address of the server illustrated in FIG. 2 is 2000:1:1::1. A tunnel may be established using a variety of protocols including IP over Hypertext Transfer Protocol Secure (IP-HTTPS), Teredo, some other protocol, or the like. For example, using IP-HTTPS, the client 210 may establish an IP-HTTPS tunnel interface by accessing the IP-HTTPS URL of the server 215 over SSL using a public address of the server 215 (e.g., 2000:1:1::1) or a NAT device in front of the server. This may involve using TCP port 443, for example.

An example of connecting to the server 215 via its global address is illustrated in FIG. 3. As illustrated in FIG. 3, the client 210 attempts to connect to the server 220 via a global IPv6 address 2000:1:1::1 associated with the URL HTTP://IPHTTPS.CONTOSO.COM/IPHTTPS. In response, the server 215 may provide the client 210 with network data associated with a gateway hosted by the server 215. This network data may include all or a prefix of a network address that the client 210 is to use for a source address in sending traffic to the private network 231. The network data may indicate whether the client is to generate an address from the prefix. The network data may also include data that indicates one or more ranges of network addresses that are routable through the gateway. The network data may also indicate whether or not the client is to route all traffic through the gateway.

If the network data includes a prefix only of the network address, this may serve to indicate to the client 210 that the client 210 is to generate the rest of the network address. If the network address includes all of the network address, the client 210 is to use the received network address as its source address when sending traffic to the private network 231. In one implementation, the client may create a virtual interface that establishes the gateway as the next-hop router for packets to send to the private network 231. This virtual interface may use the received or generated network address as its source address and may be associated with routing information that indicates that the private network 231 is reachable via the virtual interface.

When an application (not shown) or other process (not shown) of the client 210 attempts to send a message to an entity of the private network 231, network mechanisms on the client 210 may ensure that the message is routed through the virtual interface of the client. In addition, security mechanisms may ensure that the message is sent over an encrypted or other secure channel between the client 210 and the gateway providing access to the private network 231.

In establishing a tunnel, the client 210 may create a virtual interface (e.g., an IP-HTTPS interface) and associate an address with the interface. An exemplary virtual interface and tunnel are illustrated in FIG. 4. The address associated with the interface may be formed using a prefix that is associated with a gateway accessed through the virtual interface 221. This gateway may be hosted by the server 215 or reside on another device connected to the private network 231. One exemplary prefix is 3000:0:30:1000::/64.

By associating this address with the interface, the client 210 may ensure that traffic to the client 210 from the private network 231 passes through the gateway of the server 215 instead of another gateway, if any, of the private network 231. To ensure this, routes in the private network 231 having a destination address that starts with the prefix may be configured to be routed to a particular gateway. When the client 210 sends a packet to an entity of the private network using the client 210's virtual interface, this causes the packet to have a source address starting with the prefix to be sent to a gateway that forwards the packet to the private network (possibly after decrypting and un-encapsulating the packet). When the entity of the private network responds to the packet, the entity sends it to a destination address that is the source address of the packet it received. In this case, the source address is the network address of the client 210's virtual interface. As mentioned previously, this address starts with the prefix. Because the destination address of the return packet starts with the prefix, the routing configuration of the private network 231 causes the packet to be sent to the gateway.

In FIG. 4, the physical interface 211 and the virtual interface 405 of the client 210 are illustrated. After it is created, the virtual interface 405 may be associated with routing information that allows the client 210 to communicate with entities connected to the private network 231. This routing information may be pre-provisioned on the client or obtained via the server 215 or gateway.

Once the client 210 has established the virtual interface, in one implementation, the gateway may publish routes to reach the private network 231 and the ULA based tunnel endpoints. For example, the gateway may use ICMPv6 router advertisement to publish the routes to the virtual interface of the client 210.

After the client 210 has received the routing information, it may update its routing table such that the gateway is the next-hop router for some or all of the client 210's IP traffic. In updating the routing table, the client 210 may ensure that packets to the ULA endpoint are sent via the virtual interface using the IP address associated with the virtual interface rather than the client 210's IPv6 address associated with the physical interface 211 of the client 210.

In another implementation, the client 210 may be pre-configured with routes that are associated with the gateways available to reach the private network 231. In this implementation, when a gateway is selected, the client 210 may use the pre-configured route associated with the selected gateway to reach entities connected to the private network 231.

In a Teredo implementation, a default route may be used to reach entities connected to the private network 231.

The exemplary implementations above are not intended to be all-inclusive or exhaustive. Based on the teachings herein, those skilled in the art may recognize other mechanisms for routing to entities connected to the private network 231 once a connection has been established with a gateway without departing from the spirit or scope of aspects of the subject matter described herein.

With this configuration, the client 210 may then perform authentication and communicate with the private network 231 with the connection created with the virtual interface 405.

The actions above may also be taken when the private network 231 is an IPv4 network. In addition, some implementations may use DNS64 and NAT64 translation devices on the edge network in order to translate the IPv6 packets coming from the client 210 to IPv4 packets that reach the private network 231. In these implementations symmetric routing may be enforced by ensuring that traffic reaching the private network originates from the NAT64 device associated with the gateway.

Below is another example in which a client may take steps to establish connectivity to the private network 231 when the private network 231 is an IPv4 network. For this example, the following exemplary addresses are used Gateway IP address is 10.0.0.254 (which is a private IP address);

The client has an IP address given by an Internet Service Provider of (80.0.1.1) and no virtual interfaces to the private network 231; and The client has a rule that says that any traffic to the private network (e.g., 30.0.1.0/255.255.255.0) is to be tunneled through the gateway 10.0.0.254.

Although the above addresses are used, in other examples, other addresses may be used without departing from the spirit or scope of aspects of the subject matter described herein.

Below are exemplary steps that the client 210 may take to establish connectivity with an entity connect to the private network 231:

1. The client 210 tries to reach an entity (e.g., an internal server) of the private network 231. The client 210 makes the attempt using an IP address of 30.0.1.5.

2. Because of the rule mentioned above, the client attempts to encapsulate the traffic over IPsec and send it to the gateway's IP address 10.0.0.254. Since 10.0.0.254 is not routable over the Internet, the traffic does not reach the gateway nor the entity connected to the private network 231.

3. The connection detector 235 detects that a connection does not exist and informs the client 210.

4. The client 210 creates a virtual interface with a gateway using the gateway's public IP address of 80.0.1.5. In one implementation, a user interface may prompt a user that there is no connectivity so that the user can manually indicate "Connect". In another implementation, the client 210 may automatically connect without user interaction. The client 210 now has an IP address of 30.1.0.5 on the virtual interface that is associated with the gateway.

5. The client 210 tries again to reach the internal server. Using the IP address of 30.0.1.5.

6. Because of the IPsec tunnel rule mentioned above, the client 210 encapsulates the traffic over IPsec and sends it using the source address 30.1.0.5 to the gateway's IP address 10.0.0.254, which is now reachable over the virtual interface. The gateway then forwards the traffic to the internal server.

7. In responding, the internal server returns a reply to the client 30.1.0.5 through the gateway, as the routing in the private network 231 is configured so 30.1.0.0/255.2555.0.0 is routed to that specific gateway (e.g., in the case of multiple gateways).

As mentioned previously, Teredo may also be used to establish connectivity with the private network 231. Teredo is a transition technology that creates an IPv6 interface based on IPv4 connectivity. To work properly under Teredo, the client may be configured to have the gateway as next-hop router. In this example, to ensure that the gateway receives traffic between the client and the internal entity, the gateway may act as a Teredo Server and a Teredo Relay.

A Teredo Server allows clients to retrieve an IPv6 address. This IPv6 address is built from the prefix 2001:0:wwxx:yyzz::/64, where ww.xx.yy.zz is the IPv4 address of the client's Teredo server. This causes a client to have an IPv6 address with a prefix that is associated with the gateway.

The client uses the Teredo server in order to reach the IPv6 network (e.g., the private network 231), and find the most suitable relay in order to send and receive all traffic to and from the private network 231. A client may find a Teredo relay by checking from where the traffic returned.

To cause the traffic to be routed through the gateway, the gateway may be configured as both the Teredo server and Teredo relay.

In an implementation, the client picks the most suitable gateway as a Teredo server, and routes all IPv6 traffic through that gateway, while traffic is coming back from that gateway. In the private network route configuration may ensure symmetric routing by configuring the routes so that all traffic from clients having certain addresses (e.g., 2001:0:wwyy:xxzz::/64) is routed to the server through the gateway that is associated with the address ww.yy.xx.zz.

In one implementation of Teredo, a default route is created only when there is no other form of global IPv6 connectivity. In this implementation, this means that all IPv6 traffic is sent through the gateway when there is IPv4 connectivity on the client. The mechanism on the client which enables the Teredo tunnel may check for this and configure the routes appropriately.

Referring to FIG. 4, the client 210 may have a native IPv6 address given by the ISP. In that case, a Teredo tunnel may be established with the gateway. Since the client 210 already has IPv6, the Teredo tunnel may be ignored and not used.

In that case, there is a virtual interface, but the gateway does not act as a next hop router for the private network address range, so the private network may not be reached through the gateway. The connection detector 235 determines that there is no connectivity, and starts IP-HTTPS (or another tunneling protocol), which creates another virtual interface where the gateway is the next hop router.

In another implementation of Teredo, a client may create a Teredo tunnel and configure the gateway as the next hop router for IPv6 traffic even if other IPv6 connectivity is available.

Figure 5:
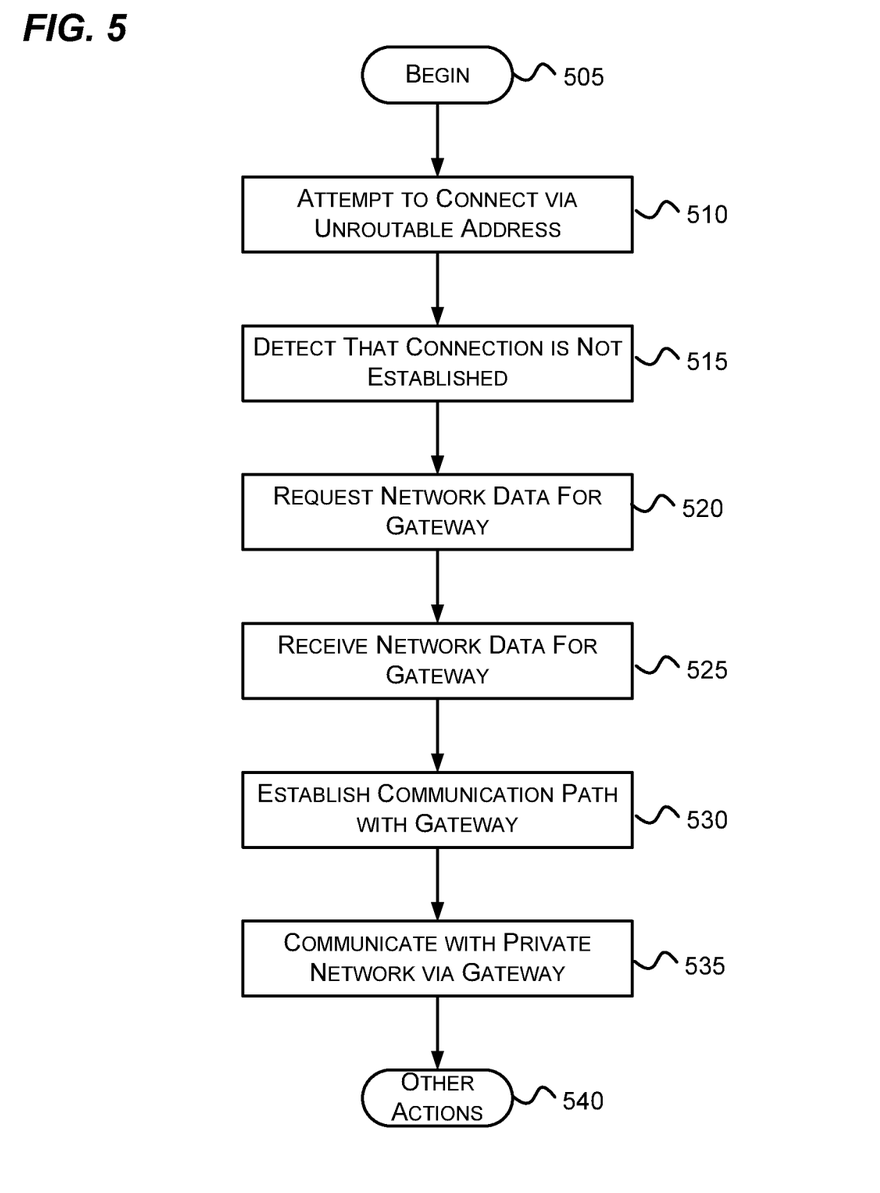
FIG. 5 is a flow diagram that generally represents exemplary actions that may occur from a client perspective in accordance with aspects of the subject matter described herein.
Figure 6:
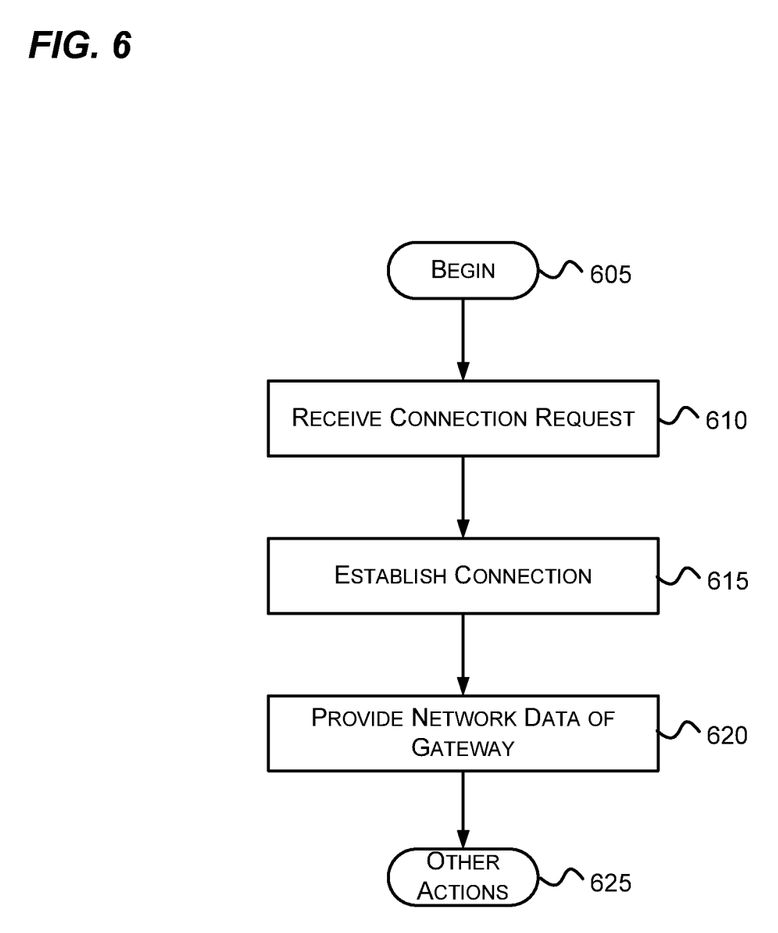
FIG. 6 is a flow diagram that generally represents exemplary actions that may occur on an offload provider in conjunction with an offload read or write request in accordance with aspects of the subject matter described herein.

FIGS. 5-6 are flow diagrams that generally represent exemplary actions that may occur in accordance with aspects of the subject matter described herein. For simplicity of explanation, the methodology described in conjunction with FIGS. 5-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 5 is a flow diagram that generally represents exemplary actions that may occur from a client perspective in accordance with aspects of the subject matter described herein. At block 505, the actions begin.

At block 510, an attempt may be made to connect to an entity of a private network. For example, referring to FIG. 2, the client 210 may attempt to connect to an entity of the private network 231 using a ULA (e.g., fd00:1234:5678::1). The ULA is reserved for use within private networks and is defined as not routable on the global IPv6 Internet. Hence, when the client 210 attempts to connect to an entity of the private network 231 using the ULA, a router (e.g., the router 225) of the network 230 is unable to find the entity associated with the ULA. As can be seen in FIG. 3, the client 210 is connected to a network (i.e., the network 230) that is external to the private network 231. The client may attempt to connect via an IPv6 address or an IPv4 address as described previously.

At block 515, detecting that a connection is not established occurs. For example, referring to FIG. 2, the connectivity detector 235 detects that there is no connection to an entity of the private network 231. For example, the client 210 may determine whether there is connectivity to any entity of the private network 231. As another example, the client 210 may check whether it can reach a tunnel endpoint associated with the private network 231 by sending a packet or other communication. As another example, the client 210 may perform a domain name system (DNS) query for a resource that is known to be connected to the private network 231.

The examples above of detecting that a connection is not established are not intended to be all-inclusive or exhaustive. Based on the teachings herein, those skilled in the art may recognize other mechanisms that may also be used to detect that a connection is not established without departing from the spirit or scope of aspects of the subject matter described herein.

At block 520, a request for network data is sent to a server connected to the private network. For example, referring to FIG. 3, the client 210 may send a request to a network address associated with HTTPS://IPHTTPS.CONTOSO.COM/IP-HTTPS, which in this example is 2000:1:1::1.

At block 525, network data for the gateway is received. This network data may include all or a prefix of a network address that the client is to use to send traffic to the private network. By using this address, the client can cause traffic from the private network to be directed to the gateway in response to traffic sent to the gateway from the client. For example, referring to FIG. 4, the server 215 may respond with a prefix of 3000:0:30:/64.

At block 530, a communication path may be established with the gateway. A communication path may include an encapsulating tunnel, an encrypting tunnel, a route to the private network, a combination of two or more of the above, and the like. This communication path may be used to transmit data to and from the private network. For example, referring to FIG. 4, the client 210 may establish a communication path with the virtual interface 221 (which is the interface of the gateway). Using this communication path, the client 210 may, in one implementation, receive routing information from the gateway that allows the client 210 to communicate with entities of the private network 231. In another implementation, the client 210 may already have routing information on a local store that allows the client 210 to communicate with entities of the private network 231.

At block 535, the client may communicate with entities of the private network via the gateway. For example, referring to FIG. 4, the client 210 may communicate with an internal server of the private network 231 via the gateway having the virtual interface 221.

At block 540, other actions, if any, may be performed.

FIG. 6 is a flow diagram that generally represents exemplary actions that may occur from a gateway perspective in accordance with aspects of the subject matter described herein. At block 605, the actions begin.

At block 610, a connection request is received from a client. For example, referring to FIG. 3, the server 215 receives a connection request from the client 210 via the physical interface 220. Previously, the client 210 may have unsuccessfully attempted to connect to a gateway by using a local address (e.g., fd00:1234:5678::1) associated with the virtual interface 221. In some implementations, the local address may not be associated with the virtual interface 221 of the server 215 and may, for example, be associated with the physical interface 220 or some other interface.

At block 615, a connection is established with the client. For example, referring to FIG. 3, the server 215 establishes a connection with the client 210. Over this connection, a request for network data may be received from the client.

At block 620, network data associated with a gateway is provided to the client. This network data may comprise all or a prefix of a network address that the client is to use to send traffic to the gateway. As indicated previously, by sending traffic with a source address having the prefix, the client 210 may ensure that response traffic from the private network 231 traverses the gateway in the presence of a plurality of gateways on the private network.

At block 625, other actions, if any, may be performed. Other actions may include, for example, configuring one or more entities of the private network to route traffic having a destination address starting with the prefix to the gateway associated with the prefix. These actions may occur, for example, prior to the other actions indicated in FIG. 6.

Figure 7:
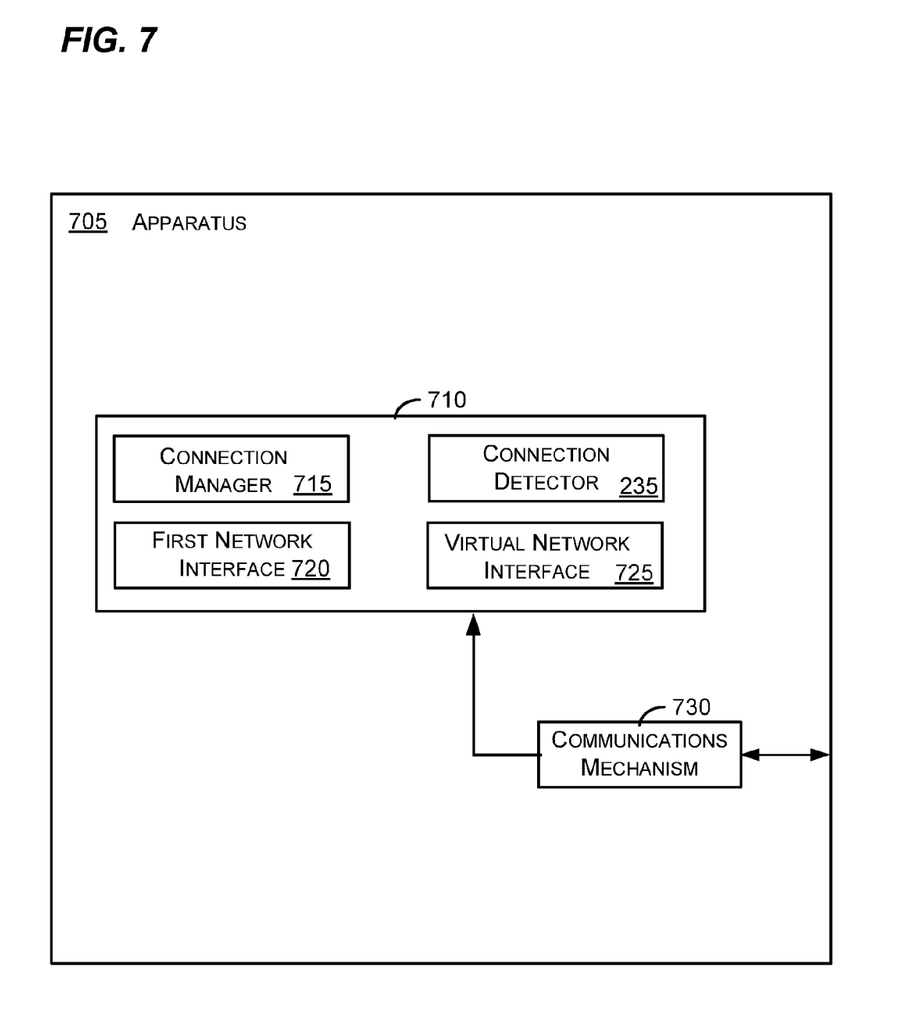
FIG. 7 is a block diagram that represents an apparatus configured in accordance with aspects of the subject matter described herein.

FIG. 7 is a block diagram that represents an apparatus that hosts a client in accordance with aspects of the subject matter described herein. The components illustrated in FIG. 7 are exemplary and are not meant to be all-inclusive of components that may be needed or included. In other embodiments, the components and/or functions described in conjunction with FIG. 7 may be included in other components (shown or not shown) or placed in subcomponents without departing from the spirit or scope of aspects of the subject matter described herein. In some embodiments, the components and/or functions described in conjunction with FIG. 7 may be distributed across multiple devices.

Turning to FIG. 7, the apparatus 705 may include client 710, a communications mechanism 730, and other components (not shown). The client 710 may include a connection manager 715, a connection detector 235, a physical network interface 720, a virtual network interface 725 and other components (not shown).

The communications mechanism 730 allows the apparatus 705 to communicate with other entities shown in FIGS. 2-4. The communications mechanism 730 may be a network interface or adapter 170, modem 172, or any other mechanism for establishing communications as described in conjunction with FIG. 1.

The first network interface 720 is a network interface by which the client 710 may communicate with a public network external to the apparatus 705 via the communications mechanism 730. In one implementation, the first network interface 720 may be associated with an IP address that identifies the client to the public network.

In another implementation, the first network interface 720 may be associated with an IP address that identifies the client to a private network. In this implementation, the client may use a network address translation (NAT) device to communicate with entities reachable over the public network 230. In this implementation, the private address of the client identifies the client to the NAT device while the NAT device may have a public address that identifies it to the public network.

The virtual network interface 725 is a network interface that is created to establish connectivity with a private network. The virtual network interface 725 may communicate with a gateway of the private network as the next-hop router for traffic directed to the private network and/or to the tunnel endpoint (ULA) address. The virtual network interface may have a network address that is different from the address of the physical network interface. The virtual network interface 725 may also use the communications mechanism 730 to send and receive traffic to a network external to the apparatus.

The connection detector 235 may operate as described in conjunction with FIGS. 2-4. The connection detector 235 may detect that connectivity to the private network has not been established via the first network interface 720. The connection detector 235 may wait for a period of time (e.g., 10 seconds) before determining that connectivity to the private network has not been established. After the connection detector 235 has determined that connectivity to the private network is not established, the connection detector 235 may provide an indication (e.g., via a message, event, or the like) to the connection manager 715.

The connection manager 715 may be operable (e.g., configured, structured, arranged, or the like) to use the first interface to attempt to establish connectivity to the private network and to respond to the indication that connection has not been established by performing actions including:

1. Obtaining a public network address of a server that is connected to the public network and the private network. The obtaining may include obtaining the public network address from a store local to the apparatus (pre-provisioned or cached), from a DNS server or other remote database, or the like;

2. Obtaining, from the server, network data associated with a gateway. The network data may include a prefix or all of a second network address. The private network may be configured to send traffic addressed to a destination address that starts with the prefix to the gateway; and 3. Creating the second interface using the obtained network data.

The connection manager 715 may also establish a tunnel with the gateway via the virtual network interface 725. These actions have been described previously.

In addition, the connection manager 715 (or the virtual network interface 725) may receive routing information from the gateway and incorporate the routing information into a routing table. The routing information may indicate a network route to one or more entities of the private network.

As can be seen from the foregoing detailed description, aspects have been described related to symmetric routing to a private network. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A client apparatus comprising:
a processing unit; a memory; a bus which couples the processing unit to the memory;
a first interface which communicates with a public network which is external to the client apparatus, the first interface is associated with a first network address of the client apparatus;
a second interface which communicates with a gateway that provides access to a private network, the second interface associated with a second network address of the client apparatus, the second interface is a virtual interface with the gateway as the next-hop router at least for traffic from the client apparatus which is directed to an entity of the private network; a connection detector which provides an indication that connectivity of the client apparatus to the private network has not been established after a connection attempt was made via the first interface; and a connection manager which uses the first interface to attempt to help establish the connectivity and favor private network addressing over public network addressing in attempts to connect with an entity of the private network across a global network from outside the private network; the client apparatus responding to the indication that connectivity to the private network has not been established in that the client apparatus attempts to obtain a public network address of a server that is connected to the private network, by obtaining from the server network data associated with the gateway, wherein the network data includes at least a prefix of a second network address, the private network sends traffic addressed to a destination address that starts with the prefix to the gateway, and the client apparatus creates the second interface with the network data.

2. The client apparatus of claim 1, wherein the connection manager uses the first interface to attempt to connect to a network address that is reserved for private networks.

3. The client apparatus of claim 1, wherein the connection manager establishes a tunnel with the gateway via the second interface.

4. The client apparatus of claim 1, wherein the connection manager receives routing information from the gateway, and to incorporate the routing information into a routing table of the client apparatus, and the routing information indicates a network route to an entity of the private network and/or to a remote tunnel endpoint.

5. A method implemented by a computing system to favor one addressing protocol, denoted here the favored addressing protocol, over another addressing protocol, denoted here the non-favored addressing protocol, when connecting to a private network from across a global network, by attempting to establish a connection using the favored addressing protocol before attempting to connect using the non-favored addressing protocol, the method comprising: the computing system attempting to connect a client to an entity of a private network by using a first address which conforms with a first addressing protocol, the client being external to the private network and also separated from the private network by part of a global network; the computing system detecting that the attempting step has failed to establish a connection between the client and the entity using the first addressing protocol, the first address being thus determined to be a network address which is non-routable on the global network; the computing system sending a request using a second address which conforms with a second addressing protocol, the request being sent from the client to a server which is connected to the private network, the second address being a routable public address of the server, the request including a request for a gateway address prefix of a gateway of the private network, wherein the private network sends the gateway traffic which uses the gateway address prefix; the computing system creating a virtual interface on the client with routing information that establishes the gateway address prefix within the client as an address prefix of a next-hop router for packets from the client to the private network; and the computing system sending a packet from the client to the entity using the gateway address prefix.

6. The method of claim 5, wherein the first address is reserved for use within the private network.

7. The method of claim 5, wherein the first address comprises a unique local address defined by Request for Comments 4193.

8. The method of claim 5, wherein the first network address comprises an Internet Protocol version 6 (IPv6) network address that is defined by Request for Comments 2460.

9. The method of claim 5, wherein the first network address comprises an Internet Protocol version 4 (IPv4) network address defined by Request for Comments 791.

10. The method of claim 5, further comprising the computing system establishing a connection with the server which is connected to the private network, by obtaining a global network address of the server using a name of the server and then using the global network address to connect to the server.

11. The method of claim 5, further comprising the computing system receiving a complete gateway address which includes the gateway address prefix.

12. The method of claim 5, further comprising the computing system receiving an indication to create a complete network address using the gateway address prefix, generating a partial network address, and combining the gateway address prefix with the partial network address to form an address for the packet.

13. A computer storage device having computer-executable instructions, which when executed perform actions of a method to favor one addressing protocol, denoted here the favored addressing protocol, over another addressing protocol, denoted here the non-favored addressing protocol, when connecting to a private network from across a global network, by attempting to establish a connection using the favored addressing protocol before attempting to connect using the non-favored addressing protocol, the method comprising: attempting to connect a client to an entity of a private network by using a first address which conforms with a first addressing protocol, the client being external to the private network and also separated from the private network by part of a global network; detecting that the attempting step has failed to establish a connection between the client and the entity using the first addressing protocol, the first address being thus determined to be a network address which is non-routable on the global network; sending a request using a second address which conforms with a second addressing protocol, the request being sent from the client to a server which is connected to the private network, the second address being a routable public address of the server, the request including a request for a gateway address prefix of a gateway of the private network, wherein the private network sends the gateway traffic which uses the gateway address prefix; creating a virtual interface on the client with routing information that establishes the gateway address prefix within the client as an address prefix of a next-hop router for packets from the client to the private network; and sending a packet from the client to the entity using the gateway address prefix.

14. The computer storage device of claim 13, wherein the private network has a plurality of gateways.

15. The computer storage device of claim 13, wherein the method further comprises generating a complete network address, using network data received from the server which is connected to the private network, and also comprises the client using the generated complete network address as a source address to send traffic to the private network.

16. The computer storage device of claim 13, wherein the private network is configured to sends the gateway traffic which contains the gateway address prefix in a destination address.

17. The computer storage device of claim 13, further comprising establishing a tunnel between the gateway and the client.

18. The computer storage device of claim 13, further comprising receiving traffic from the client at the gateway, the traffic having a source address that includes the gateway address prefix, forwarding the traffic to the entity of the private network, receiving a response at the gateway from the entity, the response having a destination address equal to a source address of the client, and forwarding the response to the client.

19. The computer storage device of claim 13, further comprising computer-executable instructions which, when executed, perform as a Teredo server.

20. The computer storage device of claim 13, further comprising computer-executable instructions which, when executed, perform as a Teredo relay to forward data on behalf of at least one Teredo client.

* * * * *